Patented Apr. 24, 1951

2,550,257

UNITED STATES PATENT OFFICE 2,550,257

PRESERVATION OF FOOD PRODUCTS

Lloyd B. Jensen, Chicago, and William A. Miller, Evergreen Park, Ill., assignors to Swift & Company, Chicago, Ill., a corporation of Illinois No Drawing. Application October 5, 1946,
Serial No. 701,406

5 Claims. (Cl. 99—150)

The present invention relates to the preparation of an antibiotic substance, and it has to do more particularly with the concentration of an antimicrobial substance of plant origin.

An object of the present invention is to provide a potent antibiotic substance of plant origin.

A further object of the invention is to provide an antibiotic substance which is non-toxic to humans.

An additional object of the invention is to provide an antibiotic substance which is heat stable.

Yet another object of the invention is to employ an antibiotic substance of grapevine origin as an effective preservative for food products.

Other objects and advantages of the invention will be apparent from a description of the invention given below.

The present invention contemplates the preparation of an antibiotic substance naturally associated with tissues of the members of the plant genus Vitis, commonly known as grape. We have found that especially the cultivated grapevine, including the root, yields an antibiotic substance of great potency as hereinafter more fully described. We have also found that the antibiotic substance produced from the grapevine is lethal to those microorganisms largely responsible for clostridial and bacillary food spoilage and staphylococcus food poisoning. The antibiotic material prepared from the grapevine may, therefore, be advantageously used to preserve food products.

The antibiotic substance of the present invention has been found to destroy gas-forming bacilli of the genus Bacillus, such as *Bacillus subtilis* (var. *niger*); the bacilli of the genus Clostridium, such as *Clostridium sporogenes*, and the disease-producing bacilli of the genus Brucella, such as *Brucella suis;* the staphylococci, such as *Staphylococcus aureus*. We have also found our antibiotic substance to be lethal against the bacterial species *Achromobacter perolens*, the organism responsible for the production of a musty odor in eggs known as "hay eggs." It would be an extremely arduous, if not an impossible, task to ascertain the response of all the existing species and varieties of microorganisms to the herein described antibiotic material, but the effects of this material against the microorganisms hereinabove mentioned illustrate the commercial and medical values thereof.

In carrying out the invention, finely cut or ground grapevine is treated with a suitable organic solvent, such as acetone. The acetone layer containing the constituents of the plant tissue soluble therein is separated from the acetone-insoluble fibrous mass, the acetone removed therefrom and the extract taken up in a carrier solvent, such as ethanol.

The following examples illustrate preferred embodiments of the invention, and the tests falling thereunder illustrate the potency of the material obtained in accordance with the processes of the examples.

*Example I.*—150 grams of grapevine, approximately two to three years old, was finely minced. The ground wood was placed in a flask and covered with acetone. The flask was held at room temperatures for 24 hours and shaken at intervals. The acetone layer containing the acetone-soluble constituents of the grapevine was separated from the insoluble material by filtration, and the acetone removed from the extract by distillation under reduced pressure at 40° C. The acetone-free extract, a highly viscous mass, was taken up in 50 ml. of ethyl alcohol, so that 1 ml. of the alcoholic extract contained the acetone soluble material in 3 grams of grapevine (1 ml.=3 g. of vine).

In order to evaluate the effectiveness of the antibiotic material in the alcohol solution obtained in accordance with Example I, the following test was performed:

Serial dilutions of the extract (1 ml.=3 g. of wood) were made in 10 cc. broth tubes and the tubes inoculated with bacteria. Dilutions of the extract were made in the broth tubes from 1 to 10 to 1 to 40,000 and inoculated with large loops of 24-hour broth cultures of a food poisoning strain of *Staphylococcus aureus* (50,000 cells), *Bacillus niger, Clostridium sporogenes* and *Achromobacter perolens*. The tubes were then allowed to incubate at a temperature of 37° C. and inspected for bacterial growth at the end of one, two and six days. In the following table are tabulated the results obtained with the aforesaid bacteria, the minus sign (—) indicating no bacterial growth, the positive sign (+), the presence of viable bacteria at incubation periods of one, two and six days.

TABLE I

*Grapevine extract (1 ml.=3 gms. of vine)*
*Dilutions in broth*

| Organism | Days | 10 | 100 | 500 | 1,000 | 2,000 | 5,000 | 10,000 | 20,000 | 40,000 | Control |
|---|---|---|---|---|---|---|---|---|---|---|---|
| Staph. aureus | 1 | − | − | − | − | − | + | + | + | + | + |
|  | 2 | − | − | − | − | − | + | + | + | + | + |
|  | 6 | − | − | − | − | + | + | + | + | + | + |
| Bacillus niger | 1 | − | − | − | + | + | + | + | + | + | + |
|  | 2 | − | − | − | + | + | + | + | + | + | + |
|  | 6 | − | − | − | + | + | + | + | + | + | + |
| Clostridium sporogenes [1] | 1 | − | − | + | + | + | + | + | + | + | + |
|  | 2 | − | − | + | + | + | + | + | + | + | + |
|  | 6 | − | − | + | + | + | + | + | + | + | + |
| Achromobacter perolens | 1 | − | − | + | + | + | + | + | + | + | + |
|  | 2 | − | − | + | + | + | + | + | + | + | + |
|  | 6 | − | − | + | + | + | + | + | + | + | + |

[1] Grown in "Difco" peptone colloid medium.

The data given in the above table indicate that the antibiotic effects of the grapevine extract vary in potency when tested against different organisms. Thus, the extract kills Staphylococcus in dilutions of 1 to 1,000, Bacillus niger in dilutions of 1 to 500, and 1 to 100 for Clostridium sporogenes and Achromobacter perolens. The bactericidal properties of the extract, lethally effective in the dilutions indicated for the various organisms, were demonstrated by inoculating nutrient agar plates with 0.1 cc. of the aforesaid dilutions which had been allowed to incubate for six days. After three days' incubation of the inoculated plates no viable bacteria were observed as a result of the transfers. The test indicates that the bacteria had been killed in dilutions of 1 to 1,000 for *Staphylococcus aureus*, 1 to 500 for *Bacillus niger*, and 1 to 100 for both *Clostridium sporogenes* and *Achromobacter perolens*.

*Example II.*—50 grams of cultivated grapevine, about 10 years old, which was beginning to sap, was finely ground, covered with acetone in a flask and held at 20° C. for three days with occasional shaking. The acetone was taken off at 41° C. by means of a water pump, and the residue dissolved in 50 ml. of ethanol so that 1 ml. of alcoholic extract contained the acetone-soluble material in one g. of wood (1 ml.=1 g. of wood).

Dilutions of the extract were made in nutrient broth and each series of dilutions were inoculated with 24-hour cultures of *Staphylococcus aureus*, *Bacillus niger* and *Brucella suis*, with the results tabulated in Table II.

TABLE II

*Dilutions in broth*

| Organism | 100 | 200 | 300 | 400 | 500 | 1,000 | 2,000 | Control |
|---|---|---|---|---|---|---|---|---|
| Staph. aureus | − | − | − | − | − | − | + | + |
| Bacillus niger | − | − | − | − | − | + | + | + |
| Brucella suis | − | − | − | − | + | + | + | + |

The tubes representing serial dilutions from a minimum dilution of 1 to 100 to a maximum dilution of 1 to 2,000 were allowed to incubate at 37° C. At the end of five days there was no evidence of bacterial growth, as indicated by the minus sign, for *Staphylococcus aureus* in dilutions of 1 to 1,000, 1 to 500 for *Bacillus niger*, and 1 to 400 for *Brucella suis*. The positive signs indicate living bacteria.

Although acetone is the preferred primary solvent, we have found that other organic solvents are suitable, for example, dioxane, ethyl acetate, methyl ethyl ketone and ethanol. We have also found our antibiotic material to be slightly soluble in water.

It is obvious that many variations in the solvent treating process may be advantageously employed. For example, since the antibiotic material isolated from grapevine is heat-stable, solvent temperatures may range from room temperatures to boiling temperature of the solvent, with consequent variations in extraction time, that is, the higher the temperature, generally the less time required for extraction. Moreover, the extraction process may be carried out in one step, for example, with ethanol or with a mixture of solvents. We have found it preferable to process the antibiotic substance contained in the grapevine by a two-stage solvent process involving first, treating the substance with a primary solvent which is subsequently removed and then, second, taking up the resulting extract with another solvent, so as to form a solution, which is a convenient form of using the product. We have found that acetone is a very effective primary solvent in producing the antibiotic substance from the plant tissue. After evaporating off the acetone the preferred solution is made with ethanol. By using alcohol we utilize its well-known properties, such as non-toxicity and ability to prevent contamination.

In the processing of food products a serious problem is that of food preservation, and although great strides have been made in improving the quality and keeping time of various food products by refrigeration, canning, curing, plant sanitation, etc., the problem of the preservation of food requires the constant attention of the food processor to improve long-established methods of treating food and to devise new means of food control.

Food spoilage is due principally to microbial action, and the species of microorganisms responsible for food deterioration are numerous. The sporing genera, Clostridium and Bacillus, for example, when contaminating food, cause food spoilage. Another serious concern of the food handler is food poisoning, which is often of an insidious nature because food products contaminated with harmful bacteria often appear organoleptically sound. Among the food poisoning bacteria, the most common food poisoner is the staphylococcus. In addition to food spoilage and food poisoning, contaminated food may be the cause of disease, for example, brucellosis produced by the Brucella organisms.

The antibacterial substance of the present invention may be used to retard or prevent microbial growth in various food products. This material may advantageously be employed in treating meat products, such as hams, sausages and canned meats; filled pastries, such as cream puffs, chocolate eclairs, custards, etc.; and canned vegetables to prevent swellings due, for example, to organisms of the genus Bacillus.

The invention will be more fully understood from the following description of a method of using the antibiotic substance, in connection with the curing of hams.

Within recent years there has been developed a curing process for meats and particularly hams known as a quick-cure which requires only a fraction of the time which was normally required by the old processes. Essentially the quick-cure process consists in pumping the pickling solution under pressure into the vascular system of the meat. By this means a ham can be cured in a period of time ranging from 15 to 18 days, rather than the 60 to 90 days required by the old processes in which the meats were usually immersed in a bath of the pickling fluid.

There has arisen, however, as the result of extensive commercial use of the quick-curing method an attendant serious health problem. The hams and other meats cured by the older immersion processes were extremely resistant to the development of pathogenic bacteria, of which various representatives of the Staphylococci may be mentioned as typical, and the general public has come to rely on this property in its eating and storage habits. Hams processed by quick-curing, on the other hand, have resulted in a meat product which, though highly satisfactory when fresh, is often less resistant to these organisms, and cases of food poisoning have resulted from improper handling due to unfamiliarity with this fact.

As hereinbefore mentioned, we have found that the antibiotic reagent herein described is lethal to a number of microbes in a 1 to 1,000 dilution of the extract, the extract being of such strength that 1 ml. of the alcoholic solution thereof contained the acetone-soluble constituents in 3 grams of wood. Therefore, the addition of 1 part of the solution to 1,000 parts of the conventional pickling solution will result in a meat product cured therewith which has a very marked increase in resistance to the development of pathogenic organisms.

The following is an example of a curing pickle stock, which may be used in a process for quick-curing ham when provided with antibiotic substance in the proportions outlined above; that is, the antibiotic substance is added in an amount such as to effect a 1 to 1,000 dilution of the antibiotic material of the arbitrary strength herein described (1 ml.=3 g. of wood).

To 100 gallons of a 90° Salometer solution there are added:

7 lbs. sodium nitrate
10 oz. sodium nitrite
20 lbs. sugar
378.5 cc. antibiotic solution The following experiments will further illustrate the practical application of my invention.

An amount of pickle was inoculated with a large number of a food poisoning type of *Staphylococcus aureus* organisms which would represent the most unfavorable conditions which could possibly be encountered. The pickle was then separated into two equal portions, and to one portion sufficient amount of grapevine product was added to form a 1 to 1000 dilution of the product. To the other portion of pickle no antibiotic substance was added. Twelve hams were then cured by the quick-curing method—six of them with pickle containing the antibiotic substance and six with pickle without the substance. The hams were then smoked according to ordinary processes. The hams were incubated at 99° F. and at the end of two weeks the six hams containing the antibiotic substance did not harbor viable staphylococci, while the other hams showed the presence of viable staphylococci.

Luncheon meat was cured according to conventional methods in which the antibiotic substance was present in a 1 to 1000 dilution. The meat product was placed in six 6-pound cans and retorted to an inside temperature of 155° F. and incubated at 99° F. After 30 days of incubation, no swelling of the cans could be observed. The control cans swelled in one week.

Obviously, many modifications and variations of the invention, as hereinabove set forth, may be made without departing from the spirit and scope thereof, and therefore only such limitations should be imposed as are indicated in the appended claims.

We claim:

1. In the process of treating food products, the step of adding to a food product a small amount of an alcoholic solution of antibiotic substance derived from the wood of the members of the genus Vitis to preserve said food products against pathogenic bacteria responsible for food poisoning and spoilage.

2. A meat pickle including a small amount of an antibiotic substance of the wood of the members of the genus Vitis extracted from the said wood by a non-aqueous organic solvent selected from the group consisting of acetone, dioxane, ethylacetate, methylethylketone, and ethanol.

3. In the process of quick-curing meats wherein a pickling solution is injected into said meat, the step of adding to said pickling solution a small amount of the antibiotic substance derived from the wood of the members of the genus Vitis by treatment with a non-aqueous organic solvent, whereby the growth of pathogenic bacteria responsible for food spoilage and poisoning in the meat are substantially retarded after the said solution is injected into the meat.

4. In the process of treating food products, the step of adding to a food product a small amount of an antibiotic substance derived from the wood of the members of the genus Vitis by treatment with a non-aqueous organic solvent to preserve said food products against pathogenic bacteria responsible for food poisoning and spoilage.

5. A meat pickle including a small amount of an antibiotic substance of the wood of the members derived from the genus Vitis by treatment with a non-aqueous organic solvent.

LLOYD B. JENSEN.
WILLIAM A. MILLER.

(References on following page)

REFERENCES CITED

The following references are of record in the file of this patent:

UNITED STATES PATENTS

| Number | Name | Date |
|---|---|---|
| 126,363 | Whiteley | Apr. 30, 1872 |
| 469,850 | Chesebrough | Mar. 1, 1892 |
| 1,113,714 | Taub et al. | Oct. 13, 1914 |
| 1,551,888 | Krebs | Sept. 1, 1925 |
| 1,559,340 | Masucci | Oct. 27, 1925 |
| 2,084,864 | Paddock | June 22, 1937 |
| 2,098,110 | Schertz et al. | Nov. 2, 1937 |
| 2,117,478 | Hall | May 17, 1938 |
| 2,173,992 | Allen | Sept. 26, 1939 |
| 2,180,750 | Urbain | Nov. 21, 1939 |
| 2,316,311 | Boatner | Apr. 13, 1943 |

OTHER REFERENCES

"Nature," May 13, 1944, vol. 153, page 598, article entitled "Antibacterial Substances in Green Plants."

"Chemical and Engineering News," September 1945, page 1622, article entitled "Penicillin as a Preservative."